United States Patent
Kim et al.

(10) Patent No.: US 11,251,502 B2
(45) Date of Patent: Feb. 15, 2022

(54) ELECTRODE ASSEMBLY AND METHOD FOR MANUFACTURING THE SAME

(71) Applicant: LG Chem, Ltd., Seoul (KR)

(72) Inventors: Hyun Tae Kim, Daejeon (KR); Byung Heon Shin, Daejeon (KR); Kieun Sung, Daejeon (KR)

(73) Assignee: LG Energy Solution, Ltd.

( * ) Notice: Subject to any disclaimer, the term of this patent is extended or adjusted under 35 U.S.C. 154(b) by 121 days.

(21) Appl. No.: 16/340,652

(22) PCT Filed: Jan. 29, 2018

(86) PCT No.: PCT/KR2018/001252
§ 371 (c)(1),
(2) Date: Apr. 9, 2019

(87) PCT Pub. No.: WO2018/186576
PCT Pub. Date: Oct. 11, 2018

(65) Prior Publication Data
US 2020/0052275 A1 Feb. 13, 2020

(30) Foreign Application Priority Data
Apr. 6, 2017 (KR) .................. 10-2017-0044541

(51) Int. Cl.
*H01M 50/46* (2021.01)
*H01M 10/0585* (2010.01)

(52) U.S. Cl.
CPC ....... *H01M 50/46* (2021.01); *H01M 10/0585* (2013.01)

(58) Field of Classification Search
CPC .................. H01M 50/46; H01M 10/0585
See application file for complete search history.

(56) References Cited

U.S. PATENT DOCUMENTS

2002/0160258 A1* 10/2002 Lee .............. H01M 50/463
429/130
2011/0052964 A1 3/2011 Kim et al.
(Continued)

FOREIGN PATENT DOCUMENTS

CN 101897058 A 11/2010
CN 104106169 A 10/2014
(Continued)

OTHER PUBLICATIONS

Extended European Search Report with Written Opinion for Application No. 18781861.2 dated Apr. 6, 2020, 8 pages.
(Continued)

*Primary Examiner* — Christopher P Domone
*Assistant Examiner* — Kimberly Wyluda
(74) *Attorney, Agent, or Firm* — Lerner, David, Littenberg, Krumholz & Mentlik, LLP

(57) ABSTRACT

The present invention relates to an electrode assembly in which a plurality of electrode stacks are stacked to improve product reliability when manufactured and a method for manufacturing the same. The present invention also relates to a method for manufacturing an electrode assembly and includes a preparation step of preparing a plurality of electrode stacks in which an electrode and a separator are alternately stacked, a stacking step of stacking the plurality of electrode stacks on each other, a packaging step of wrapping and packaging a circumferential potion of the plurality of stacked electrode stacks using a separator member, and a fixing step of heating and pressing the separator member to fix the plurality of stacked electrode stacks.

9 Claims, 4 Drawing Sheets

(56) References Cited

U.S. PATENT DOCUMENTS

| | | |
|---|---|---|
| 2011/0117404 A1 | 5/2011 | Ahn et al. |
| 2014/0272507 A1 | 9/2014 | Ku et al. |
| 2014/0342215 A1 | 11/2014 | Kwon et al. |
| 2015/0026970 A1 | 1/2015 | Jung et al. |

FOREIGN PATENT DOCUMENTS

| | | |
|---|---|---|
| CN | 105576296 A | 5/2016 |
| JP | 2006-019075 A | 1/2006 |
| JP | 2011-210522 A | 10/2011 |
| KR | 10-0555848 B1 | 3/2006 |
| KR | 10-2007-0120210 A | 12/2007 |
| KR | 10-2008-0015163 A | 2/2008 |
| KR | 10-2014-0004015 A | 1/2014 |
| KR | 10-2016-0002050 A | 1/2016 |
| KR | 10-2016-0005421 A | 1/2016 |
| KR | 10-2016-0058566 A | 5/2016 |

OTHER PUBLICATIONS

International Search Report for Application No. PCT/KR2018/001252 dated May 11, 2018, 2 pages.
Chinese Search Report for Application No. 201880004288.6 dated Jul. 27, 2021, 2 Pages.

\* cited by examiner

ELECTRODE ASSEMBLY AND METHOD FOR MANUFACTURING THE SAME

CROSS-REFERENCES TO RELATED APPLICATIONS

This application is a U.S. national phase application, pursuant to 35 U.S.C. § 371, of PCT/KR2018/001252, filed Jan. 29, 2018, designating the United States, which claims priority to Korean Application No. 10-2017-0044541, filed Apr. 6, 2017. The entire contents of the aforementioned patent applications are incorporated herein by this reference.

TECHNICAL FIELD

The present invention relates to an electrode assembly and a method for manufacturing the same, and more particularly, to an electrode assembly in which a plurality of electrode stacks are stacked to improve product reliability when manufactured and a method for manufacturing the same.

BACKGROUND ART

Due to the living environment in which one is surrounded by various electric and electronic devices, batteries (cells) that generate electric energy through physical or chemical reaction to supply the generated electric energy to the outside are used when AC power is not supplied to the building, or DC power is required.

Among such batteries, primary batteries and secondary batteries, which are chemical batteries using chemical reaction, are being generally used. The primary batteries are consumable batteries which are collectively referred to as dry batteries.

Secondary batteries are rechargeable batteries that are manufactured using a material in which a redox process between electric current and a substance is repeatable plural times. When the reduction reaction is performed on the material by the electric current, power is charged, and when the oxidation reaction is performed on the material, power is discharged. The charging-discharging is repeatedly performed to generate electricity.

A secondary battery that is improved in safety and capacity according to the related art is disclosed in Korea Patent Publication No. 10-2007-0120210.

An electrode assembly of a lithium secondary battery according to the related art has been expanded to a field that requires high energy such as vehicles, electric power storages, and the like from limited applications of electronic devices, using a plurality of electrode assemblies.

Due to this necessity, a folding cell in which a plurality of electrode stacks are stacked has been manufactured.

However, when the plurality of electrode stacks are stacked, there is a problem that the electrodes are broken due to a gap between the electrode stacks.

Further, when the plurality of electrode stacks are stacked, there is a problem of increased frequency that protrusion of a positive electrode and a negative electrode from the electrode stacks occurs.

DISCLOSURE OF THE INVENTION

Technical Problem

Therefore, the present invention has been made to solve the above-mentioned problem, and an object of the prevent invention is to provide an electrode in which a plurality of electrode stacks are stacked at a predetermined thickness to improve adhesion and a method for manufacturing the same.

Technical Solution

A method for manufacturing an electrode assembly according to an embodiment of the present invention includes a preparation step of preparing a plurality of electrode stacks in which an electrode and a separator are alternately stacked; a stacking step of stacking the plurality of electrode stacks on each other; a packaging step of wrapping and packaging a circumferential potion of the plurality of stacked electrode stacks using a separator member; and a fixing step of heating and pressing the separator member to fix the plurality of stacked electrode stacks.

In the preparation step, the folded electrode stacks may be prepared.

In the preparation step, the electrode stacks having shapes different from each other may be prepared.

In the fixing step, the separator member wound around the circumferential portion of the electrode stacks may be heated and pressed by a hot press.

An electrode assembly according to an embodiment of the present invention includes a plurality of electrode stacks in which an electrode and a separator are alternately stacked; and a separator member that wraps and fixes the plurality of stacked electrode stacks.

Each of the electrode stacks may have a folded shape.

The separator member may be fused while wrapping the plurality of stacked electrode stacks.

The separator member may wrap a circumferential portion of surfaces, which are exposed to the outside, of the plurality of stacked electrode stacks.

The separator member may wrap a body portion except both ends of the electrode stacks in a direction parallel to a direction in which an electrode lead coupled to the electrode stacks protrudes.

When the separator member that wraps the electrode stacks is spread, the separator member may include a first area, a second area, and a third area, which are sequentially arranged and each having a width that corresponds to a width of the electrode stacks, and a fourth area that is continuously arranged from the third area and having a width less than the width of the electrode stacks, and the electrode stacks may be attached to the first area and the third area.

Advantageous Effects

According to the present invention, the plurality of electrode stacks may be stacked at a predetermined thickness.

According to the present invention, the plurality of electrode stacks may be stacked with the strong adhesion.

According to the present invention, the plurality of electrode stacks may be stacked to prevent the defects from occurring while the electrode assembly is manufactured.

According to the present invention, the plurality of electrode stacks may be stacked to manufacture the secondary battery having a high energy.

MODE FOR CARRYING OUT THE INVENTION

Figure 1:
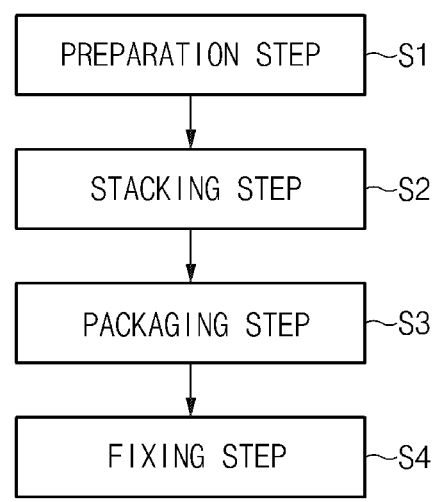
FIG. 1 is a flowchart illustrating a method for manufacturing an electrode assembly according to an embodiment of the present invention.

Hereinafter, a secondary battery and a method for manufacturing the same according to preferred embodiments of the present invention will be described in detail with reference to the accompanying drawings.

Terms or words used in the specification and claims should not be construed as limited to a lexical meaning, and should be understood as appropriate notions by the inventor based on that he/she is able to define terms to describe his/her invention in the best way to be seen by others. Therefore, embodiments and drawings described herein are simply exemplary and not exhaustive, and it will be understood that various equivalents may be made to take the place of the embodiments.

In the drawings, the dimension of each of components or a specific portion constituting the component is exaggerated, omitted, or schematically illustrated for convenience in description and clarity. Thus, the dimension of each element does not entirely reflect an actual size. Moreover, detailed descriptions related to well-known functions or configurations will be ruled out in order not to unnecessarily obscure subject matters of the present invention.

FIG. 1 is a flowchart illustrating a method for manufacturing an electrode assembly according to an embodiment of the present invention.

As illustrated in FIG. 1, a method for manufacturing an electrode assembly according to an embodiment of the present invention includes a preparation step (S1), a stacking step (S2), a packaging step (S3), and a fixing step (S4).

The preparation step (S1) may be a step of preparing a plurality of electrode stacks 10 in which an electrode and a separator are alternately stacked.

In addition, each of the electrode stacks 10 prepared in the preparation step (S1) may be in a folded state.

Further, the electrode stacks 10 prepared in the preparation step (S1) may have shapes different from each other.

The stacking step (S2) is a step of stacking the plurality of electrode stacks 10.

The packaging step (S3) is a step of wrapping and packaging the plurality of electrode stacks 10 stacked in the stacking step (S2) using a separator member 20.

The stacking step (S2) and the packaging step (S3) may be performed at the same time.

The fixing step (S4) is a step of heating and pressing the separator member 20 that wraps the electrode stacks 10 to fix the plurality of stacked electrode stacks 10 to fuse and bond the separator member 20.

In the fixing step (S4), the separator member 20 wound around a circumferential portion of the electrode stack 10 may be heated and pressed using a hot press to be fixed.

Figure 2:
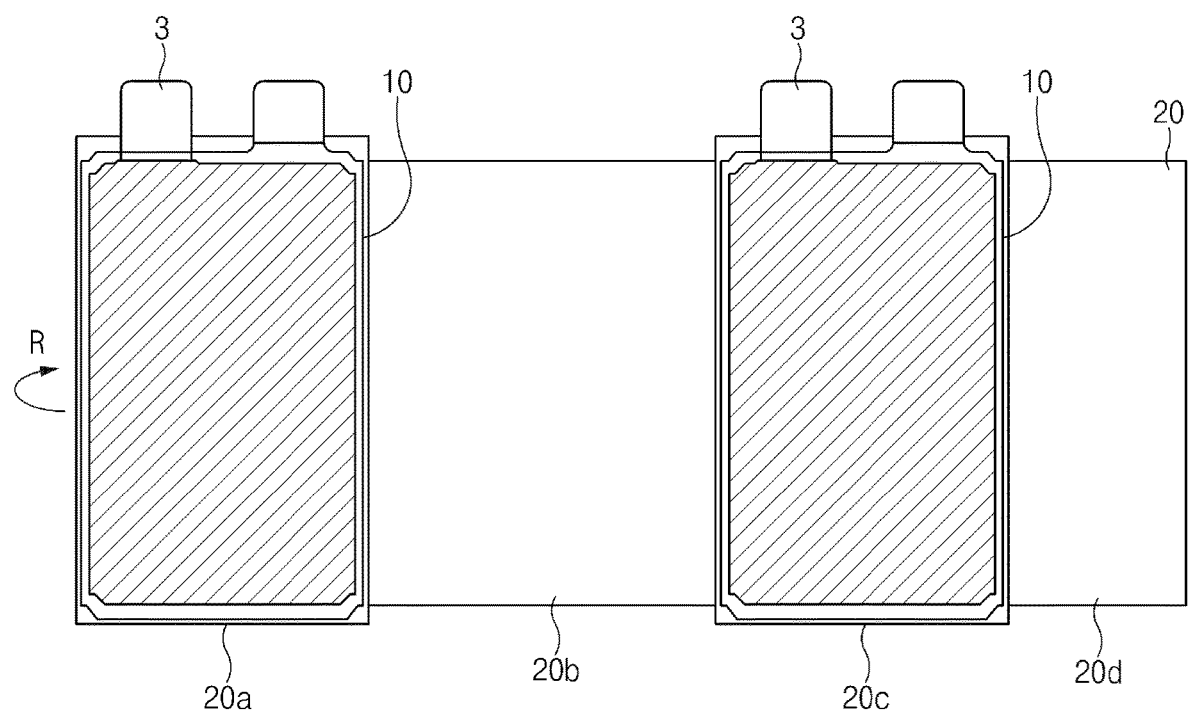
FIG. 2 is a development view of the electrode assembly according to an embodiment of the present invention.

FIG. 2 is a development view of the electrode assembly according to an embodiment of the present invention.

As illustrated in FIG. 2, when the separator member 20 that wraps the electrode stack 10 is spread, the separator member 20 may include a first area 20a, a second area 20b, and a third area 20c, each of which has a width that corresponds to a width of the electrode stack 10 and is sequentially arranged. The separator member 20 may also include a fourth area 20d, which has a width less than the width of the electrode stack 10 and is continuously arranged to the third area 20c.

The electrode stack 10 may be attached to each of the first area 20a and the third area 20c to space one electrode stack 10a apart from the other electrode stack 10b by the second area 20b.

The separator member 20 may be rolled (R) to stack the plurality of electrode stacks 10 to allow the separator member 20 to wrap the circumferential portion of the electrode stack 10.

When the fourth area 20d wraps the electrode stack 10, at least a portion of the fourth area 20d may wrap the electrode stack 10 to overlap the other area of the separator member 20. Further, when the overlapping portion between the fourth area 20d and the other area of the separator member 20 is heated and pressed by the hot press, the separator member 20 may be fused to each other to allow the plurality of electrode stacks 10 to be fixed by the separator member 20 in the state in which the electrode stacks 10 are stacked.

Thus, the plurality of electrode stacks 10 may be fixed to each other with strong adhesion.

Figure 3:
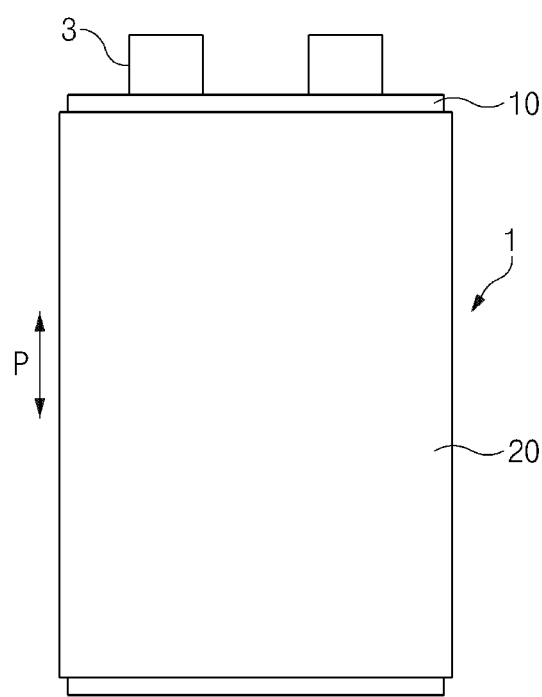
FIG. 3 is a plan view of the electrode assembly according to an embodiment of the present invention.
Figure 4:
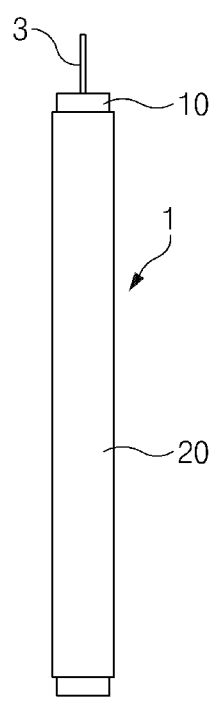
FIG. 4 is a side view of FIG. 3.

FIG. 3 is a plan view of the electrode assembly according to an embodiment of the present invention, and FIG. 4 is a side view of FIG. 3.

As illustrated in FIGS. 3 and 4, the electrode assembly 1 according to the present invention includes a plurality of electrode stacks 10 that are stacked on each other and fixed by the separator member 20 and a separator member 20 that wraps and fixes the plurality of stacked electrode stacks 10. In each of the electrode stacks 10, an electrode and a separator are alternately stacked.

The electrode of the electrode stack 10 may include a positive electrode and a negative electrode which have polarities different from each other.

The positive electrode may be an aluminum plate and include a positive electrode coating portion coated with the positive electrode active material and a positive electrode non-coating portion which is not coated with the positive electrode active material.

The positive electrode active material may include a lithium-containing transition metal oxide such as $LiCoO_2$, $LiNiO_2$, $LiMnO_2$, and $LiMnO_4$ or a lithium chalcogenide compound.

The positive electrode coating portion may be formed, for example, by applying the positive electrode active material to a portion of at least one surface of the aluminum plate, and the remaining portion of the aluminum plate, which is not coated with the positive electrode active material, may be defined as the positive electrode non-coating portion.

A positive electrode tab may be attached to the positive electrode non-coating portion.

The negative electrode may be a copper plate and include a negative electrode coating portion coated with the negative electrode active material and a negative electrode non-coating portion which is not coated with the negative electrode active material.

A negative electrode tab may be attached to the negative electrode non-coating portion.

The negative electrode active material may be a carbon material such as crystalline carbon, amorphous carbon, a carbon composite, and a carbon fiber, a lithium metal, or a lithium alloy.

The negative electrode coating portion may be formed, for example, by applying the negative electrode active material to a portion of at least one surface of the copper plate, and the remaining portion of the copper plate, which is not coated with the negative electrode active material, may be defined as the negative electrode non-coating portion.

In addition, the separator may be manufactured by applying a polyvinylidene fluoride-hexafluoropropylene copolymer (PVDF-HFP co-polymer) to one base material selected from the group consisting of, for example, polyethylene (PE), polystyrene (PS), polypropylene (PP), and a copolymer of polyethylene (PE) and polypropylene.

The electrode stack 10 may have a folded shape. The electrodes and the separators may be gathered together to form a unit having a folded shape.

The separator member 20 may wrap a circumferential portion of surfaces, which are exposed to the outside, of the plurality of stacked electrode stacks 10.

Alternatively, the separator member 20 may wrap a body portion except both ends of the electrode stack 10 in a direction P parallel to a direction in which an electrode lead 3 coupled to the electrode stack 10 protrudes. The configuration that wraps the body portion except both ends may be merely one embodiment, and thus, a configuration that wraps the body portion as well as the both ends may be also possible.

However, when the body portion except both ends is wrapped, the separator member 20 may be reduced in size to decrease manufacturing costs.

As described above, according to the present invention, the plurality of electrode stacks may be stacked at the predetermined thickness.

According to the present invention, the plurality of electrode stacks may be stacked with a strong adhesion.

According to the present invention, the plurality of electrode stacks may be stacked to prevent defects from occurring while the electrode assembly is manufactured.

According to the present invention, the plurality of electrode stacks may be stacked to manufacture the secondary battery with high energy.

According to the present invention, the fixing force may be significantly improved compared to a case in which the electrode stacks are fixed by a tape. In the case of using a tape, the electrode stacks may be easily separated or rolled to be deformed during a degassing process. However, according to the present invention, the electrode stacks may be maintained in the good state without being separated during the degassing process.

Moreover, a cosmetic appearance of a pouch may be significantly improved compared to the case in which the electrode stacks are fixed by the tape. In the attachment using the tape, marking may occur to deteriorate the cosmetic appearance.

Although the electrode assembly and the method for manufacturing the same according to the present invention has been described above with reference to the exemplary drawings, various changes and modifications may be made thereto by one skilled in the art without departing from the scope and spirit of the invention as set forth in the appended claims.

The invention claimed is:

1. A method for manufacturing an electrode assembly, the method comprising:
   a first preparation step of preparing a first electrode stack in which first electrodes and a first separator are alternately stacked, the first electrode stack defining a predetermined width;
   a second preparation step of preparing a second electrode stack in which second electrodes and a second separator are alternatively stacked, the second electrode stack defining a width equal to the predetermined width;
   an attaching step of attaching the first and second electrode stacks to a separator member, the separator member, when unwrapped, comprises sequentially and continuously arranged first, second, third and fourth areas, wherein each of the first area, the second area and the third area have a width corresponding to the predetermined width, and the fourth area has a width less than the width of the predetermined width, and the attaching step further comprises attaching the first electrode stack to the first area and the second electrode stack to the third area;
   a stacking step of stacking the first and second electrode stacks on each other;
   a packaging step of wrapping and packaging a circumferential potion of the first and second stacked electrode stacks using the separator member; and
   a fixing step of heating and pressing the fourth area of the separator member to another area of the separator member to fix the plurality of stacked electrode stacks.

2. The method of claim 1, wherein, in the preparation step, the first and second folded electrode stacks are prepared.

3. The method of claim 1, wherein, in the fixing step, the separator member wound around the circumferential portion of the first and second electrode stacks is heated and pressed by a hot press.

4. An electrode assembly comprising:
   a first electrode stack in which first electrodes and a first separator are alternately stacked, the first electrode stack defining a predetermined width;
   a second electrode stack in which second electrodes and a second separator are alternatively stacked, the second electrode stack defining a width equal to the predetermined width; and
   a separator member that wraps and fixes the first electrode stack and the second electrode stack in a stacked configuration,
   wherein when the separator member is unwrapped, the separator member comprises sequentially and continuously arranged first, second, third and fourth areas,
   wherein each of the first area, the second area and the third areas have a width corresponding to the predetermined width, and the fourth area has a width less than the predetermined width, and
   wherein the first electrode stack is attached to the first area and the second electrode stack attached to the third area, and
   wherein when the separator member is wrapped, the fourth area is overlapped with and fixed to another area of the separator member.

5. The electrode assembly of claim 4, wherein each of the first and second electrode stacks has a folded shape.

6. The electrode assembly of claim 4, wherein the separator member is fused while wrapping the first and second electrode stacks.

7. The electrode assembly of claim 4, wherein the separator member wraps a circumferential surface of the first and second electrode stacks, which are exposed to an outside of the first and second electrode stacks.

8. The electrode assembly of claim 4, wherein the separator member wraps a body portion except both ends of the first and second electrode stacks in a direction parallel to a direction in which an electrode lead coupled to the first and second electrode stacks protrudes.

9. The electrode assembly of claim 4, wherein the separator member is rolled about the circumferential surface of the first and second electrode stacks, which are exposed to an outside of the first and second electrode stacks.

* * * * *